(12) United States Patent
Loraas et al.

(10) Patent No.: US 6,412,841 B1
(45) Date of Patent: Jul. 2, 2002

(54) MULTI-USE CLEANUP TOOL SYSTEM

(75) Inventors: Orlan J. Loraas, Fargo, ND (US); Gordon J. Loraas, Volga, SD (US)

(73) Assignee: Handi Products, LLC., Fargo, ND (US)

( * ) Notice: Subject to any disclaimer, the term of this patent is extended or adjusted under 35 U.S.C. 154(b) by 0 days.

(21) Appl. No.: 09/669,103

(22) Filed: Sep. 25, 2000

Related U.S. Application Data
(60) Provisional application No. 60/159,956, filed on Oct. 18, 1999.

(51) Int. Cl.[7] .............................. A01B 1/20; A47L 13/52
(52) U.S. Cl. ...................... 294/51; 15/257.7; 294/53.5; 294/55
(58) Field of Search .......................... 294/1.4, 51, 53.5, 294/54.5, 55; 15/257.1–257.4, 25.7

(56) References Cited

U.S. PATENT DOCUMENTS

| | | | | |
|---|---|---|---|---|
| 341,160 | A | * 5/1886 | Myers | 294/53.5 |
| 497,401 | A | * 5/1893 | Bates | 15/257.7 |
| 2,987,749 | A | * 6/1961 | Gortner | 294/51 X |
| 3,063,174 | A | * 11/1962 | Ludin | 294/55 X |
| 5,343,589 | A | * 9/1994 | Davenport | 15/257.4 |
| 5,367,737 | A | * 11/1994 | Vosbikian et al. | 294/53.5 X |
| 5,476,299 | A | * 12/1995 | Whaley | 294/55 |
| 5,921,596 | A | * 7/1999 | Sheriff et al. | 294/1.4 |

FOREIGN PATENT DOCUMENTS

| | | | | |
|---|---|---|---|---|
| GB | 825425 | * 12/1959 | | 294/53.5 |
| SE | 170697 | * 3/1960 | | 294/53.5 |

* cited by examiner

*Primary Examiner*—Johnny D. Cherry
(74) *Attorney, Agent, or Firm*—Michael S. Neustel

(57) ABSTRACT

A multi-use cleanup tool system used for providing a portable device that can be utilized as a dustpan or a shovel. The multi-use cleanup tool system includes a scoop, support bracket attached to the scoop, an elongate handle pivotally attached to the support bracket, and a locking fastener attached to the elongate handle and the support bracket for allowing an individual to secure a desired position of the elongate handle with respect to the scoop. The support bracket preferably includes a pair of vertical members having a pair of corresponding slots for slidably receiving the locking fastener. An interiorly threaded locking handle is in threadable engagement with a distal portion of the locking fastener for allowing the individual to selectively secure the position of the elongate handle with respect to the scoop. By adjusting the angle of the elongate handle with respect to the scoop, the individual is able to easily convert the device from a dustpan to a shovel depending upon the item required by the individual.

19 Claims, 7 Drawing Sheets

MULTI-USE CLEANUP TOOL SYSTEM

CROSS-REFERENCE TO RELATED U.S. PATENT APPLICATION

I hereby claim benefit under Title 35, United States Code, Section 119(e) of U.S. provisional patent application Ser. No. 60/159,956 filed Oct. 18, 1999.

BACKGROUND OF THE INVENTION

1. Field of the Invention

The present invention relates generally to shovel devices and more specifically it relates to a multi-use cleanup tool system for providing a portable device that can be utilized as a dustpan or a shovel.

2. Description of the Prior Art

Dustpans and shovels have been in use for years. Conventional shovels are utilized for collecting debris and other items that aren't easily moved and collected by the means of conventional sweeping. Conventional shovels are comprised of an elongated handle with a fixed scoop portion at the distal end thereof for collecting debris. Conventional dustpans are typically comprised of an elongate handle that is attached traversely to a scoop.

The main problem with conventional shovels is that the pitch of the handle with respect to the scoop cannot be adjusted as desired by the user. In addition, conventional dustpans typically do not allow for adjustment of the pitch of the handle with respect to the scoop. Finally, no device commercially available is capable of being easily converted from a shovel to a dustpan and vice versa.

Examples of patented shovels and dustpans which are illustrative of such prior art include U.S. Pat. No. 5,921,596 to Sheriff et al.; U.S. Pat. No. 316,315 to Elrod; U.S. Pat. No. 5,417,044 to Russo; U.S. Pat. No. 4,986,587 to Lozano; U.S. Pat. No. 4,718,707 to Greenhunt; and U.S. Pat. No. 219,884 to Patton.

While these devices may be suitable for the particular purpose to which they address, they are not as suitable for providing a portable device that can be utilized as a dustpan or a shovel.

In these respects, the multi-use cleanup tool system according to the present invention substantially departs from the conventional concepts and designs of the prior art, and in so doing provides an apparatus primarily developed for the purpose of providing a portable device that can be utilized as a dustpan or a shovel.

SUMMARY OF THE INVENTION

In view of the foregoing disadvantages inherent in the known types of shovels and dustpans now present in the prior art, the present invention provides a new multiuse cleanup tool system construction wherein the same can be utilized for providing a portable device that can be utilized as a dustpan or a shovel.

The general purpose of the present invention, which will be described subsequently in greater detail, is to provide a new multi-use cleanup tool system that has many of the advantages of the shovels and dustpans mentioned heretofore and many novel features that result in a new multi-use cleanup tool system which is not anticipated, rendered obvious, suggested, or even implied by any of the prior art shovels and dustpans, either alone or in any combination thereof.

To attain this, the present invention generally comprises a scoop, a support bracket attached to the scoop, an elongate handle pivotally attached to the support bracket, and a locking fastener attached to the elongate handle and the support bracket for allowing an individual to secure a desired position of the elongate handle with respect to the scoop. The support bracket preferably includes a pair of vertical members having a pair of corresponding slots for slidably receiving the locking fastener. An interiorly threaded locking handle is in threadable engagement with a distal portion of said locking fastener for allowing the individual to selectively secure the position of the elongate handle with respect to the scoop. By adjusting the angle of the elongate handle with respect to the scoop, the individual is able to easily convert the device from a dustpan to a shovel depending upon the item required by the individual.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a multi-use cleanup tool system that will overcome the shortcomings of the prior art devices.

A second object is to provide a multi-use cleanup tool system for providing a portable device that can be utilized as a dustpan or a shovel.

Another object is to provide a multi-use cleanup tool system that has a pivoting handle to accommodate for the most comfortable position for performing the scooping and collecting operations of debris.

An additional object is to provide a multi-use cleanup tool system that provides ease of storage.

A further object is to provide a multi-use cleanup tool system that is capable of remaining within a locked vertical position that is self-supporting.

Another object is to provide a multi-use cleanup tool system that allows a user to position the device upon a surface being cleaned thereby allowing debris to be swept into the scoop portion.

A further object is to provide a multi-use cleanup tool system that allows an individual to collect and deposit debris without physically engaging the scoop portion.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
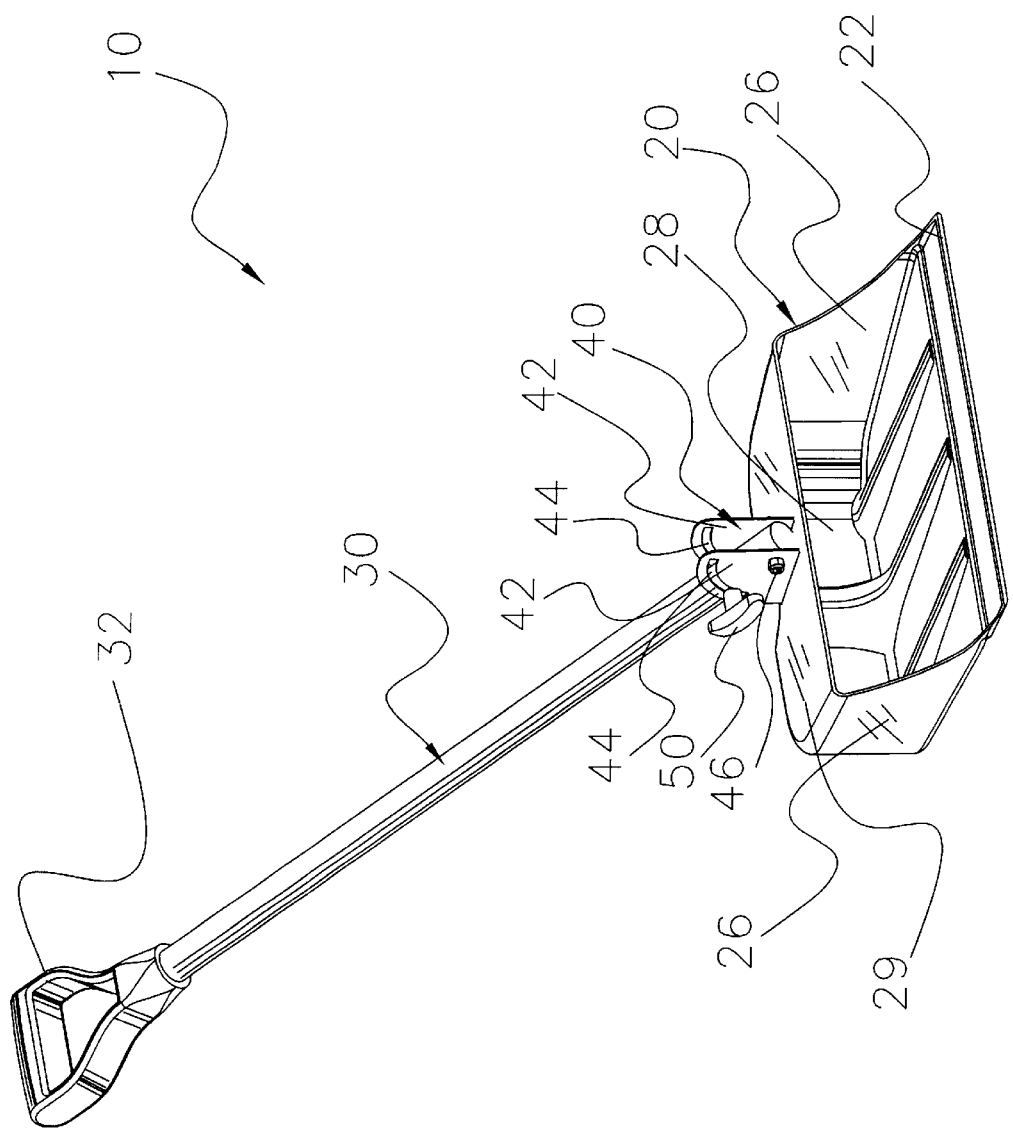
FIG. 1 is an upper perspective view of the present invention.

Turning now descriptively to the drawings, in which similar reference characters denote similar elements throughout the several views, FIGS. 1 through 7 illustrate a multi-use cleanup tool system 10, which comprises a scoop 20, a support bracket 40 attached to the scoop 20, an elongate handle 30 pivotally attached to the support bracket 40, and a locking fastener 52 attached to the elongate handle 30 and the support bracket 40 for allowing an individual to secure a desired position of the elongate handle 30 with respect to the scoop 20. The support bracket 40 preferably includes a pair of vertical members 42 having a pair of corresponding slots 44 for slidably receiving the locking fastener 52. An interiorly threaded locking handle 50 is in threadable engagement with a distal portion of said locking fastener 52 for allowing the individual to selectively secure the position of the elongate handle 30 with respect to the scoop 20. By adjusting the angle of the elongate handle 30 with respect to the scoop 20, the individual is able to easily convert the device from a dustpan to a shovel depending upon the item required by the individual.

As shown in FIGS. 1 through 7 of the drawings, the scoop 20 includes a floor 24 having a front edge 22, a pair of side walls 26, a rear wall 28, and an upper portion 29. The scoop 20 may have various shapes and designs as can be appreciated. In addition, the scoop 20 may be constructed of various types of materials including metals and plastics.

Figure 2:
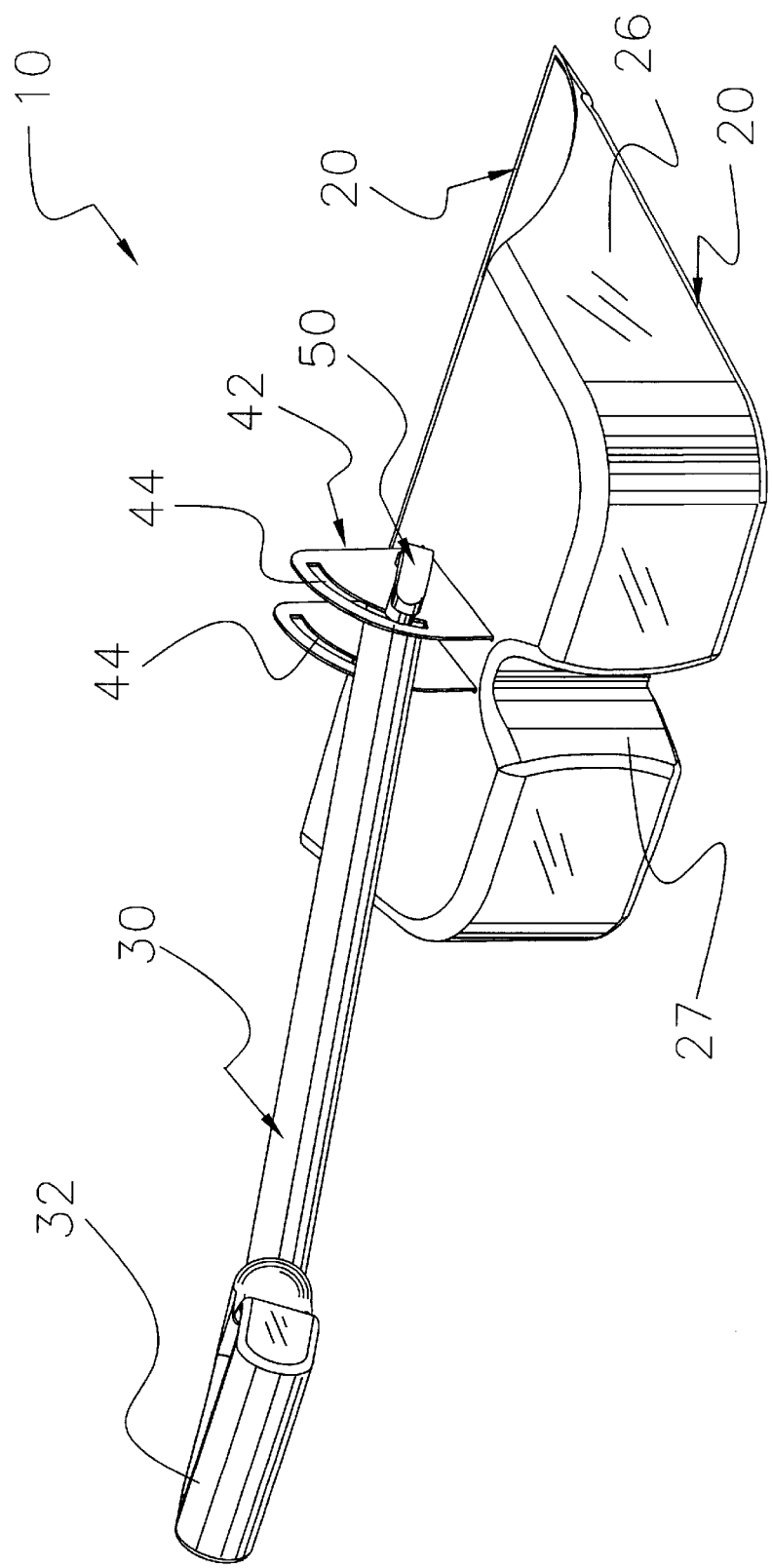
FIG. 2 is a rear upper perspective view of the present invention in the scooping position.
Figure 5:
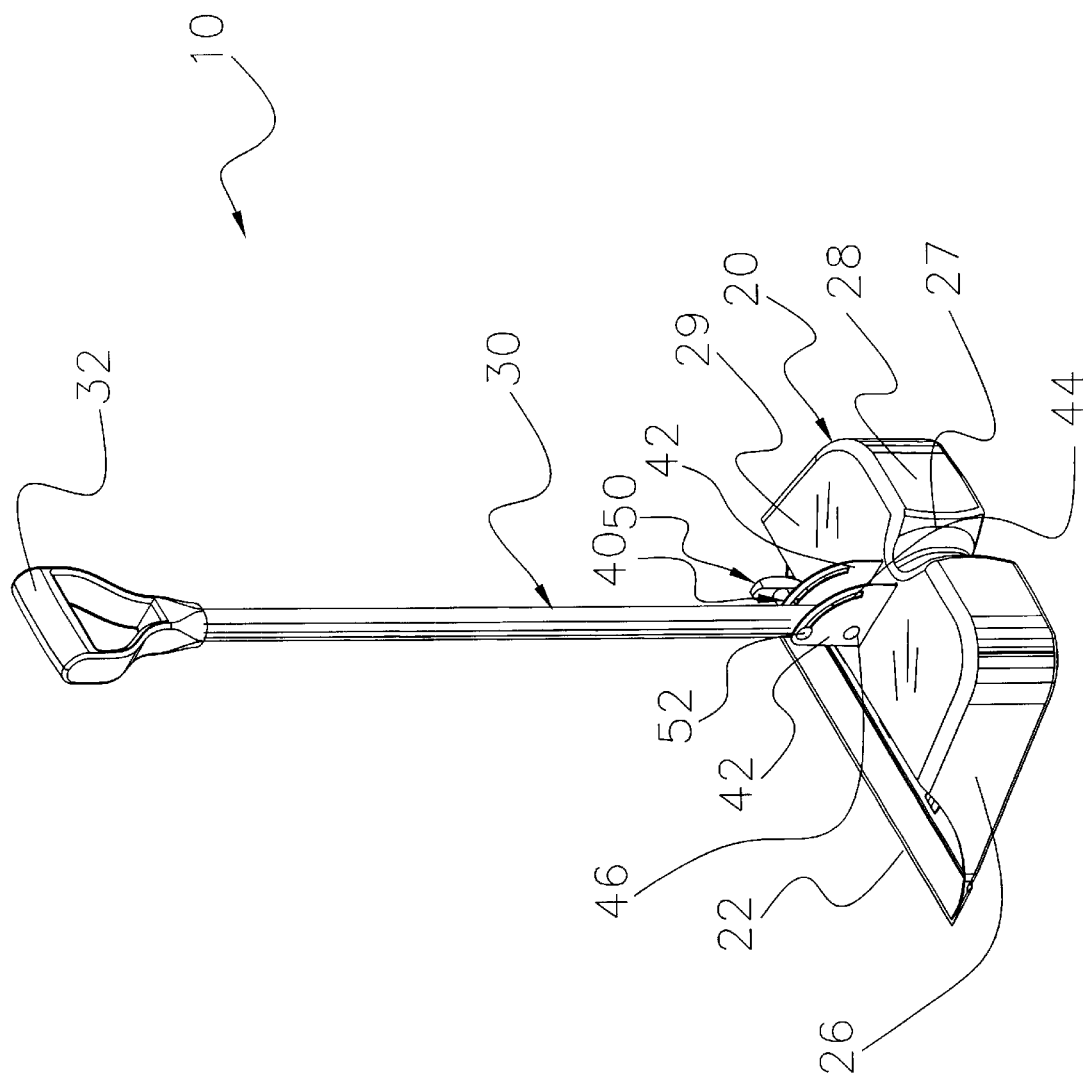
FIG. 5 is a rear upper perspective view of the present invention in the collecting position.
Figure 6:
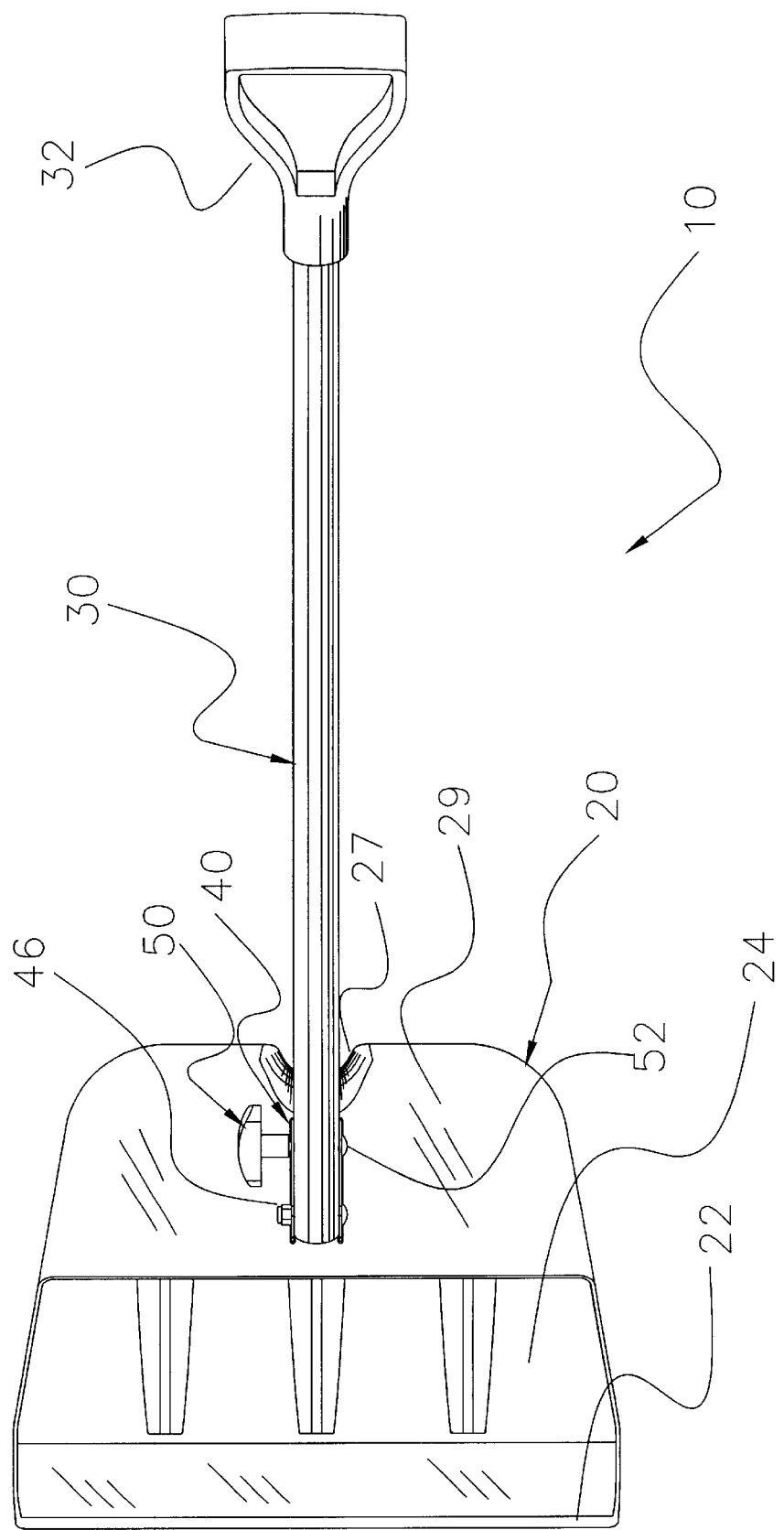
FIG. 6 is a top view of the present invention with the handle angled with respect to the scoop.
Figure 7:
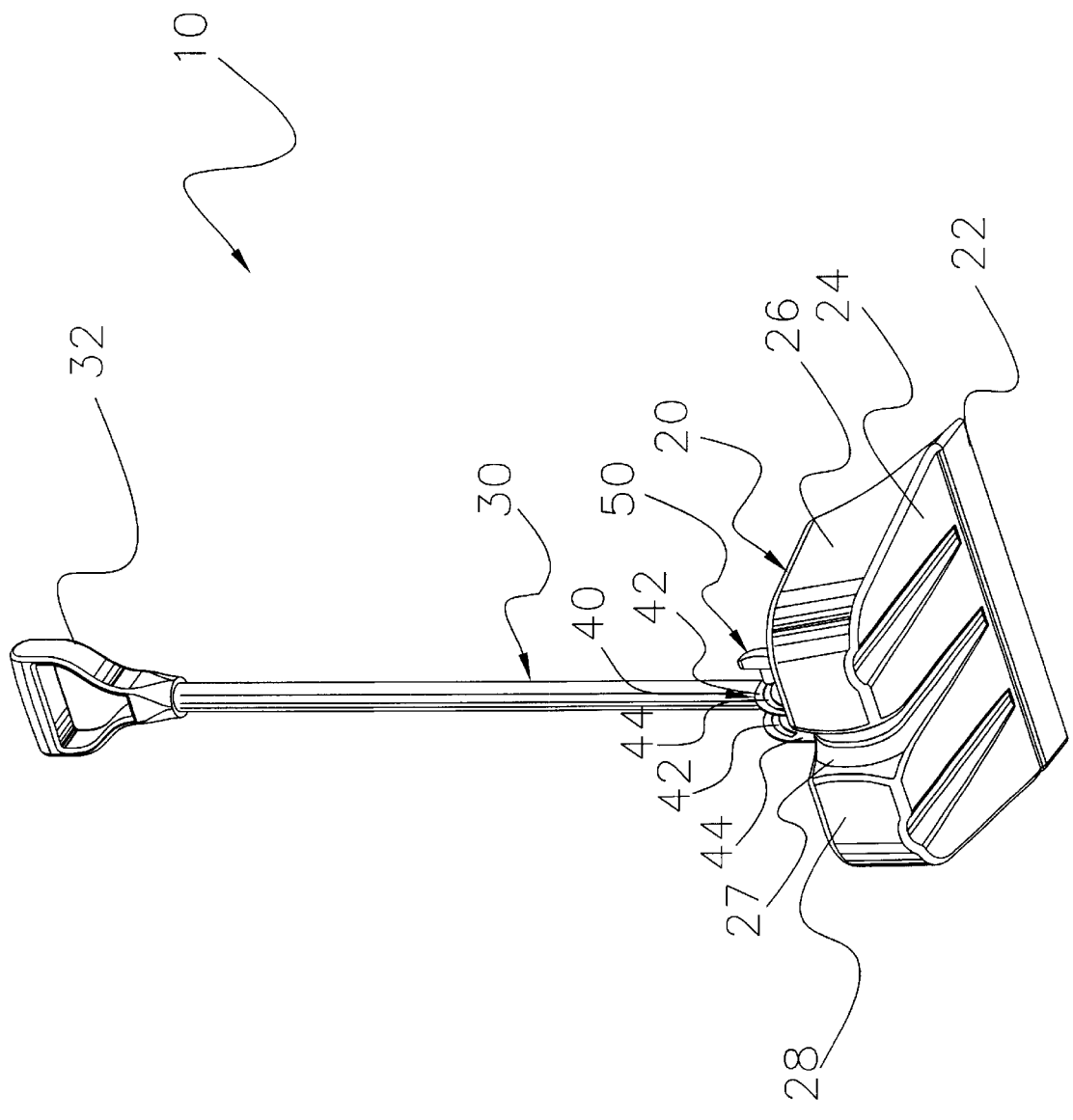
FIG. 7 is a rear lower perspective view of the present invention.

An indentation 27 within the rear wall 28 of the scoop 20 provides additional support within the upper portion 29 of the scoop 20 as best shown in FIGS. 2, 5 and 7 of the drawings. The indention preferably is vertically orientated extending between the floor 24 and the upper portion 29.

As shown in FIGS. 1 through 6 of the drawings, the support bracket 40 is preferably attached to the upper portion 29 of the scoop 20. It can be appreciated that the support bracket 40 may be attached to the rear wall 28 or the floor 24 of the scoop 20; however, for the purpose of providing a desired balance between the handle 30 and the scoop 20 the support bracket 40 is preferably positioned centrally upon the upper portion 29 of the scoop 20.

As best shown in FIGS. 1 and 2 of the drawings, the support bracket 40 preferably includes a pair of vertical members 42. The vertical members 42 include a pair of corresponding curved slots 44 that slidably receive the locking fastener 52 for allowing adjustment of the position of the elongate handle 30. The curved slots 44 preferably have a radius of curvature corresponding to a radius of curvature of the handle 30 as defined by the radius the handle 30 makes when pivoting upon the support bracket 40.

As best shown in FIG. 1 of the drawings, the distal end of the elongate handle 30 is pivotally attached to the lower portion of the support bracket 40 between the vertical members 42 by a pivot pin 46 or similar mechanism. The elongate handle 30 may have any well-known shape or structure utilized for handles. A gripping member 32 is preferably attached to the distal end of the elongate handle 30 opposite of the support bracket 40 for assisting in the gripping of the handle by a user.

As best shown in FIGS. 1 through 4 of the drawings, the locking fastener 52 extends through the slots 44 of the vertical members 42 and through the elongate handle 30 a finite distance above the pivot pin 46. An interiorly threaded locking handle 50 is threadably engaged to the distal portion of the locking fastener 52 exposed through the vertical members 42 for allowing tightening of the locking fastener 52 thereby forcing the vertical members 42 inwardly upon the elongate handle 30 thereby preventing pivotal movement of the elongate handle 30 with respect to the support bracket 40 and scoop 20.

Figure 3:
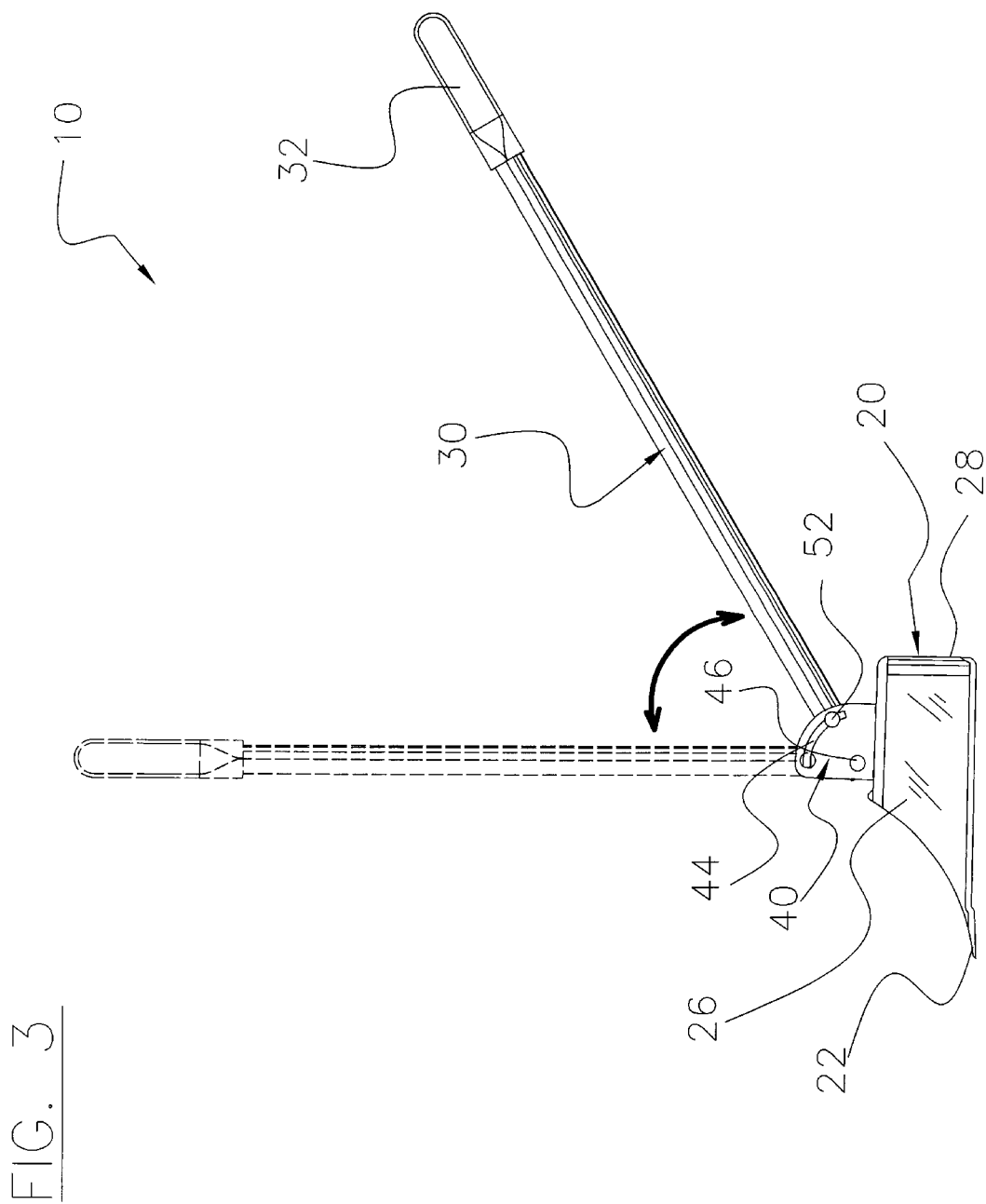
FIG. 3 is a side view showing the pivoting action of the present invention.
Figure 4:
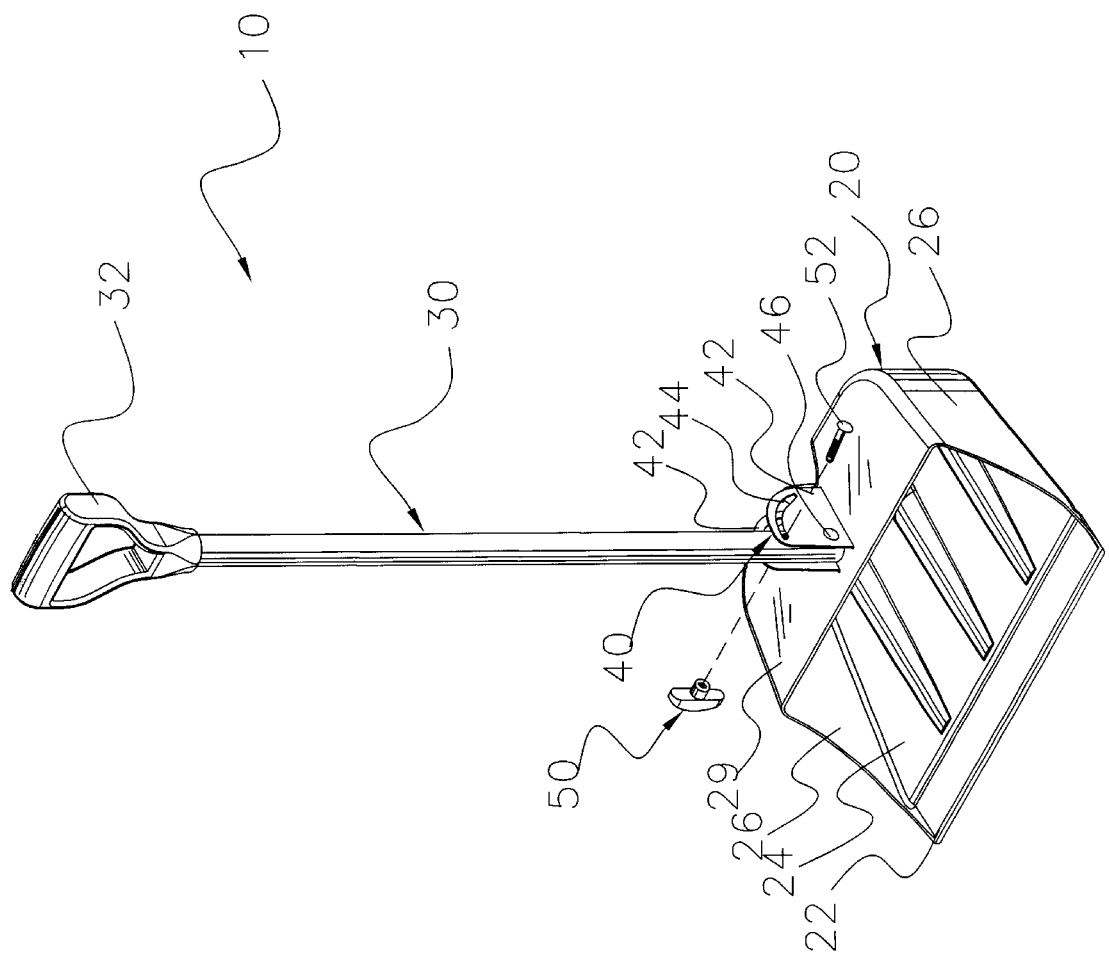
FIG. 4 is an exploded upper perspective view of the present invention.

In use, the user grasps the locking handle 50 and manipulates the locking handle 50 counter-clockwise to loosen the locking fastener 52 upon the locking fastener 52 thereby allowing the vertical members 42 to expand and for allowing the elongate handle 30 to pivot freely within the constraints of the slots 44 in the support bracket 40. After a desirable position is acquired, the user tightens the locking fastener 52 by twisting it in the clockwise direction upon the locking fastener 52, therefore holding the elongate handle 30 tightly in the desired position. When the elongate handle 30 is positioned substantially orthogonally with respect to the floor 24 of the scoop 20, the device is utilized similar to a conventional "dustpan" as shown in FIGS. 3 through 5 of the drawings. When the elongate handle 30 is in the upright position the device is able to be self-standing upon a surface without requiring support by an individual. When the elongate handle 30 is positioned at an angle with respect to the floor 24 of the scoop 20, the device is utilized similar to a conventional "shovel" as shown in FIGS. 1 through 3 of the drawings. The user is able to adjust the angle of the elongate handle 30 to various angles as desired for usage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A multi-use cleanup tool system, comprising:

a scoop having a floor, a front edge, a pair of side walls, a rear wall, and an upper portion defining a cavity for receiving debris;

a support bracket having a pair of vertical members, wherein said support bracket is attached to said upper portion of said scoop;

an elongate handle pivotally attached to a lower portion of said support bracket between said pair of vertical members at a pivot point; and a means for securing said handle within a secured position relative to said scoop.

2. The multi-use cleanup tool system of claim 1, wherein said handle is positionable orthogonally with respect to said floor.

3. The multi-use cleanup tool system of claim 2, wherein said handle is positionable at an angle less than 45 degrees with respect to said floor.

4. The multi-use cleanup tool system of claim 1, wherein said means for securing said handle comprises:

a locking fastener movably positioned within a pair of curved slots within said pair of vertical members of said support bracket, wherein said locking fastener extends through said handle and wherein said curved slots have a radius of curvature corresponding to a radius of curvature of said handle; and an interiorly threaded member threadably attached to a distal portion of said locking fastener.

5. The multi-use cleanup tool system of claim 4, wherein said interiorly threaded member is comprised of a gripping member for assisting in securing said handle.

6. The multi-use cleanup tool system of claim 1, wherein a distal end of said handle opposite of said support bracket includes a gripping member.

7. The multi-use cleanup tool system of claim 1, wherein said rear wall includes a central vertically orientated indention for providing additional support to said support bracket and wherein said support bracket is positioned a finite distance from a plane of said rear wall.

8. A multi-use cleanup tool system, comprising:

a scoop having a floor defining a first plane, a front edge, a pair of side walls, a rear wall, and an upper portion defining a second plane forming a cavity within said scoop for receiving debris;

wherein said second plane of said upper portion is substantially parallel to said first plane of said floor;

a support bracket having a pair of vertical members, wherein said support bracket is attached to said upper portion of said scoop;

an elongate handle pivotally attached to a lower portion of said support bracket between said pair of vertical members at a pivot point; and a securing structure attached to said support bracket for securing said handle within a secured position relative to said scoop.

9. The multi-use cleanup tool system of claim 8, wherein said handle is positionable orthogonally with respect to said floor.

10. The multi-use cleanup tool system of claim 8, wherein said securing structure comprises:

a locking fastener movably positioned within a pair of curved slots within said pair of vertical members of said support bracket, wherein said locking fastener extends through said handle and wherein said curved slots have a radius of curvature corresponding to a radius of curvature of said handle; and an interiorly threaded member threadably attached to a distal portion of said locking fastener.

11. The multi-use cleanup tool system of claim 8, wherein said handle is pivotally attached to said lower portion of said support bracket by a pivot pin.

12. The multi-use cleanup tool system of claim 8, wherein a distal end of said handle opposite of said support bracket includes a gripping member.

13. The multi-use cleanup tool system of claim 8, wherein said rear wall includes a central vertically orientated indention for providing additional support to said support bracket and wherein said support bracket is positioned a finite distance from a plane of said rear wall.

14. A multi-use cleanup tool system, comprising:

a scoop having a floor defining a first plane, a front edge, a pair of side walls, a rear wall, and an upper portion defining a second plane forming a cavity within said scoop for receiving debris;

wherein said second plane of said upper portion is substantially parallel to said first plane of said floor;

a support bracket having a pair of vertical members, wherein said support bracket is attached centrally to said upper portion of said scoop;

an elongate handle pivotally attached to a lower portion of said support bracket between said pair of vertical members at a pivot point; and a securing structure attached to said support bracket for securing said handle within a secured position relative to said scoop.

15. The multi-use cleanup tool system of claim 14, wherein said handle is positionable orthogonally with respect to said floor.

16. The multi-use cleanup tool system of claim 14, wherein said securing structure comprises:

a locking fastener movably positioned within a pair of curved slots within said pair of vertical members of said support bracket, wherein said locking fastener extends through said handle and wherein said curved slots have a radius of curvature corresponding to a radius of curvature of said handle; and an interiorly threaded member threadably attached to a distal portion of said locking fastener.

17. The multi-use cleanup tool system of claim 14, wherein said handle is pivotally attached to said lower portion of said support bracket by a pivot pin.

18. The multi-use cleanup tool system of claim 14, wherein a distal end of said handle opposite of said support bracket includes a gripping member.

19. The multi-use cleanup tool system of claim 14, wherein said rear wall includes a central vertically orientated indention for providing additional support to said support bracket and wherein said support bracket is positioned a finite distance from a plane of said rear wall.

* * * * *